Sept. 12, 1933.     L. T. ELIEL     1,926,584
PHOTOGRAPHIC TRANSFORMING APPARATUS
Original Filed Feb. 8, 1927    2 Sheets-Sheet 1

INVENTOR:
Leon T. Eliel;
BY
Attorney.

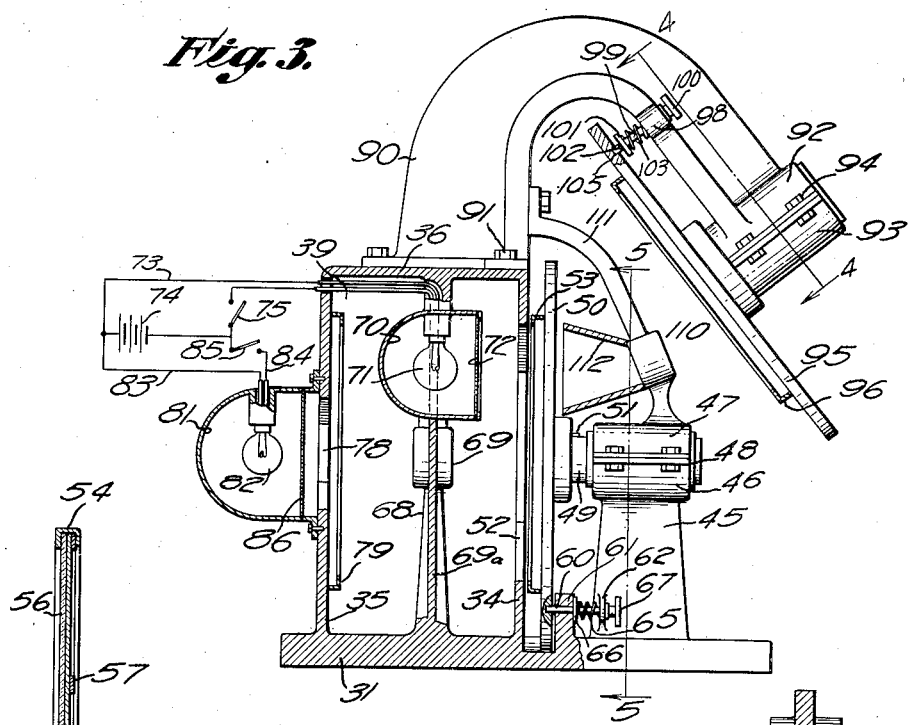
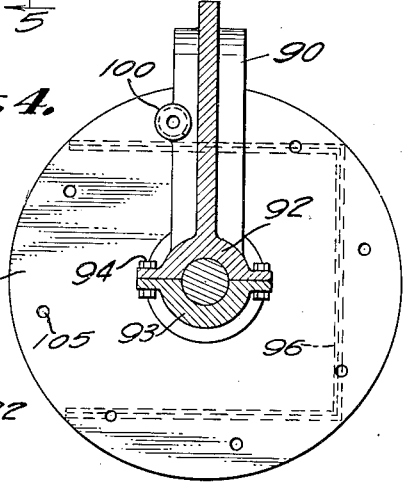
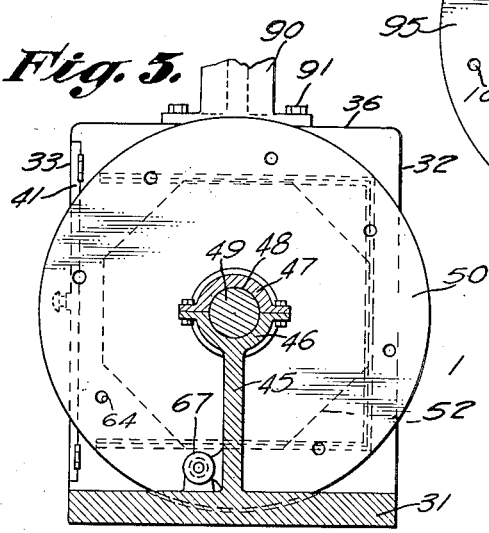

Patented Sept. 12, 1933

1,926,584

UNITED STATES PATENT OFFICE 1,926,584

PHOTOGRAPHIC TRANSFORMING APPARATUS

Leon T. Eliel, Los Angeles, Calif.

Original application February 8, 1927, Serial No. 166,729. Divided and this application August 28, 1929. Serial No. 388,979

15 Claims. (Cl. 88—24)

My invention relates to the art of photography and more particularly to a novel process and apparatus for making aerial photographs.

This application is a division of my co-pending application, Serial No. 166,729, filed February 8, 1927, which has matured into Patent No. 1,735,109, dated November 12, 1929 in which is disclosed a novel method of photographing relatively extensive areas of terrain by photographing a central area in the usual manner and simultaneously photographing a plurality of side areas completely surrounding the central area. These side areas are photographed obliquely, and the side images thus formed are distorted inasmuch as they cannot be directly used with the central image in producing a unitary picture.

It is an object of the present invention to provide a novel method and apparatus for transforming such side images, or other equivalent images, into a unitary or composite image of the subject such as could be recorded by a single lens.

A further object of the invention is to provide a photographic transforming apparatus for a multi-lens camera in which corrections for non-parallelism of axes are automatically made.

Still a further object of the invention lies in the provision of a photographic transforming apparatus which prints a plurality of images in succession, these images being correctly matched.

Further objects of the invention lie in the particular details of construction.

Still other objects and advantages of the invention will be evident from the following description.

In the drawings:

Fig. 3 is a side view, partially in section, of the transforming apparatus of my invention.

Figs. 4 and 5 are sectional views taken on corresponding lines of Fig. 3.

Fig. 6 is a sectional view of a frame of my invention with its associated film and mask.

In illustrating my invention, I shall particularly describe that form which finds particular utility when used for transforming photographic images such as are formed in the camera described in my parent application. This camera provides a film-holding mechanism which holds a photographic film in a single plane. This film is indicated by the numeral 10 of Fig. 1, and by the term "film" I refer to a photographic emulsion which may be positioned on a suitable backing such as glass or celluloid and do not desire this term to be interpreted only in its narrower sense including only a celluloid backing with a coating of photo-sensitive emulsion.

Figure 1:
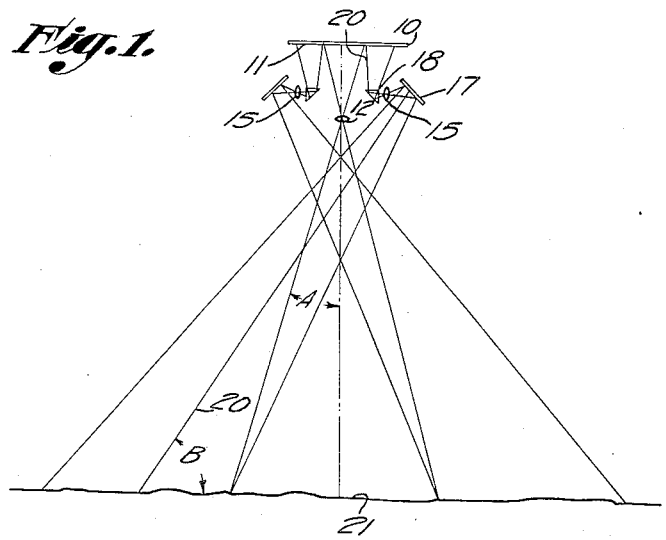
Fig. 1 is a diagrammatic view illustrating the lens arrangement of a camera forming the images which are to be subsequently transformed.
Figure 2:
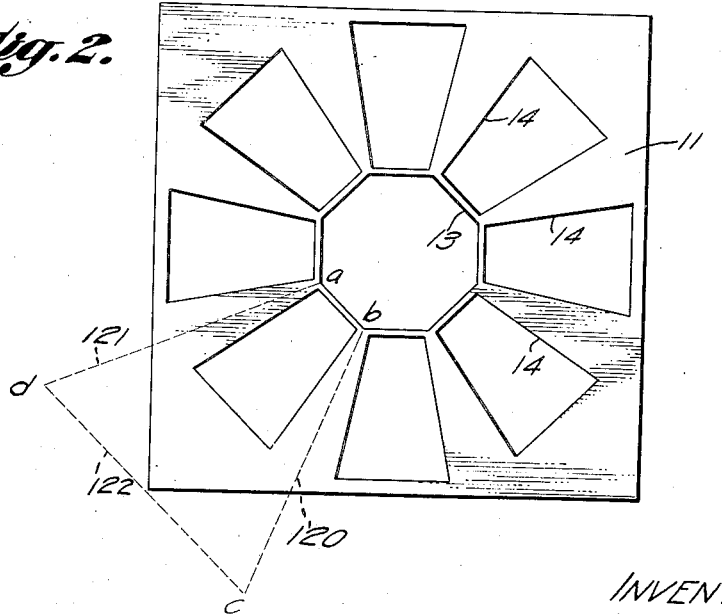
Fig. 2 is a face view of a multi-aperture mask of my invention.

A mask 11 of the type shown in Fig. 2 is positioned between a central lens 12 and the film 10, this mask providing a central octagonal aperture 13 surrounded by a plurality of trapezoidal side apertures 14, the parallel edges of each side aperture may conveniently be parallel to that side of the hexagonal central aperture there-adjacent. It will be noted from Fig. 1 that the principal axis of the central lens is perpendicular to the plane of the film, thereby producing on the film a central octagonal image which I have herein defined as being undistorted in the sense that transformation is not necessary, because the external ray of light passing through the principal axis of the lens is perpendicular to the film.

A plurality of side lenses entirely surrounding the central lens are also provided, Fig. 1 showing two oppositely disposed side lenses respectively designated by the numeral 15, each of which is adapted to form side images on the film 10 through the side apertures, it being understood that each side lens on the camera is adapted to project a side image through one of the side apertures 14 in the mask 11, so that the number of side lenses 15 corresponds to the number of side apertures 14. The side images thus formed are photographed obliquely relative to the principal axis of the central lens, and this may best be accomplished by the lens and the reflector arrangement shown in Fig. 1, whereby each side image is formed by a lens, the axis of which is perpendicular to the central axis of the central lens 12 and extends radially therefrom. A primary reflector 17 is positioned in front of each lens 15 and reflects rays emanating from an area adjacent the area covered by the central lens 12, as best shown in Fig. 1, these rays being again reflected after passing through the side lens 15 by means of a secondary reflector 18 which may be a mirror or prism, the rays then striking the film 10 through the side aperture corresponding to this side lens. Thus, if we consider the external ray of light 20 which passes through the axis of the side lens 15, it becomes apparent that this ray is not perpendicular to the film 10 but makes an angle A with the external axis of the central lens. Similarly, this ray makes an angle B with a horizontal surface such as the ground 21, assuming, of course, that the film was exposed in a horizontal position.

The angles A and B are substantially complementary, it being understood that Fig. 1 is very much distorted insofar as the size of the lens system relative to the distance from the earth surface 21 is concerned. The angle A has been termed the angle of obliquity, and this angle is the same for each of the side images. It should thus be clear that the side image formed in each side aperture 14 is a distorted image inasmuch as the central external ray is not perpendicular to the plane of the film and that the side images must be corrected for tilt before they can be combined with the central image in forming a unitary image useful in map making.

This invention relates to a machine for correcting the side images for tilt and at the same time matching these images with each other and with the central image, thereby producing a resultant composite image such as could be recorded by a single wide angle lens.

One embodiment of such a transforming apparatus is shown in Figs. 3 to 6 inclusive. Referring particularly to Figs. 3 and 5, the transforming apparatus comprises a base 31 from which side walls 32 and 33 and front and rear walls 34 and 35 extend upward, these walls cooperating with a top 36 in defining a chamber 39. A door 41 is hinged to the side wall 33 so as to make this chamber readily accessible to the operator.

A bearing bracket 45 extends upward from the base 31 in front of the front wall 34 and forms at its upper end a journal 46 which, in cooperation with a cap 47, forms a bearing 48. A shaft 49 is rotatably supported in the bearing 48 and mounts a transparent circular plate or mask 50 suitably secured thereto as by a key 51, this plate lying adjacent the front wall 34 and being adapted to receive light rays through an octagonal opening 52 formed in the front wall 34.

Attached to the face of the circular plate 50 is a frame guide 53 which is adapted to slidably receive a frame 54 of the type shown in Fig. 6, this frame being adapted to contain either the film 10 containing the central and side images, or a suitable printing medium, and to maintain this film or printing medium in a single plane. In Fig. 6 I have illustrated the film 10 with its celluloid backing and being held in the frame in a single plane by means of a glass supporting plate 56 and a mask 57 similar to the one shown in Fig. 2, whereby the side images appearing on the film are accurately matched with the apertures of the mask 57. The frame may be easily slid in the frame guide 53 and it is thus rotatably mounted in such a manner that the axis of the shaft 51 passes centrally through the central aperture of the mask 57.

The angular position of the associated plate 50 and its associated frame guide 53 and frame 54 is determined by a pin 60 suitably journaled in an upward extension 61 and a boss 62 and adapted to be resiliently retained in any one of a series of holes 64 by means of a spring 65 placed between the boss 62 and a washer 66 formed integrally with the pin 60. A head 67 is provided for drawing the pin from any of the holes 64, whereupon the plate may be rotated until the pin slips into the next hole. I prefer to provide eight equally spaced holes in the circular plate so that this plate may be moved through an eighth of a revolution between exposures.

Extending between the base 31 and the top 36 is a bracket 68 which supports a lens in a mount 69, the principal axis of which coincides with the axis of rotation of the shaft 49, there being an opaque light shield 69a extending between the walls 32 and 33 and attached to the bracket 68. Also mounted on the bracket 68 is an upper reflector 70 in which is positioned a light source 71, there being a diffusing screen in the form of a piece of ground glass and light wedge 72 positioned across the reflector 70, whereby the light source 71 may project light rays through the opening 52 and through that side aperture 14 of the mask 11 which is uppermost when the frame 54 is positioned in the guide 53. I have shown the light source 71 as being connected by a wire 73 to one terminal of a battery 74, the other terminal being connected to the light source through a switch 75 so that the source may be energized and made luminous when this switch is closed.

The rear wall 35 has an octagonal opening 78 cut therein which is slightly larger than the central octagonal aperture 13 of the mask. A frame guide 79, similar to the frame guide 53, is so mounted in the light chamber 39 that when one of the frames 54 is positioned therein the central octagonal aperture of the mask in this frame, and thus the central image of the film, will be concentric with the principal axis of the lens positioned in the lens mount 69, and thus with the axis of the shaft 49.

A rear reflector 81 is positioned adjacent the octagonal opening 79 and encloses a light source 82 shown in the form of an electric bulb which is supplied with current from the battery 74 through conductors 83 and 84, the latter including a switch 85 for controlling the luminating of the light source. A suitable diffusing means such as the ground glass 86 is positioned in the rear reflector and in front of the light source so that the octagonal opening 78 is evenly illuminated.

A curved bracket 90 is bolted to the top 36 by means of bolts 91, this bracket being substantially T-shaped in cross-section for the sake of rigidity. A journal 92 is provided at the extreme outer end of the bracket 90 and cooperates with a cap 93 to form a bearing 94 for journaling a shaft. The axis of this shaft extends down at an angle best shown in Fig. 3, and the lower end of this shaft retains a circular plate 95 which may be similar to the circular plate 50 previously described. The lower surface of the plate 95 retains a frame guide 96 similar to the guides 53 and 79, the frame guides 79, 53 and 96 being hereinafter termed primary, secondary and tertiary frame guides, respectively.

Slidably mounted in a lug 98 of the bracket 90 is a pin 99 provided with a head 100. A washer 101 is held against a pin 102 by means of a spring 103 compressed between this washer and the lug 98 in such a manner as to hold the pin 99 in advanced position. When in this position the lower end of this pin is adapted to snugly engage any one of a series of eight equally spaced holes 105 drilled in the upper part of the circular plate 95 at equal radial distances from the axis of rotation of this plate. The pin 99 thus holds the plate 95 in any one of eight positions, these positions corresponding to the positions of the circular plate 50 in a manner as will be hereinafter described.

A lens mount 110 is formed integrally with the cap 47 of the bearing 48 and is connected by an arm 111 to the bracket 90, there being a light shield 112 secured to the lens mount 110 and extending toward the wall 34, this shield serving the purpose of the ordinary bellows in a camera. The plane of the lens in the lens mount 110, the plane of the film or printing medium in the frame guide 96, and the plane of the film in the frame guide 53 should intersect in the same straight line. Furthermore, the angle between the frame guide 96 and the frame guide 53 should be equal to the angle A. With these angles correct and by the use of lenses of correct focal length, the correction for tilt will automatically be made.

In the operation of my invention an exposed film, either negative or positive, is placed in one frame 54 together with the mask 57, as best shown in Fig. 6, and this frame is slipped into the primary frame guide 79. When in this position, the central image will lie directly in front of the octagonal opening 78. Another frame 54 is slid into the secondary frame guide 53 of the circular plate 50, this frame having a suitable printing medium therein. For the purpose of distinction I shall hereinafter term this frame a secondary one, the frame in the guide 79 being termed a primary one. The light source 82 is then illuminated by closing the switch 85, and the light rays passing through the central image of the film are focused on the printing medium by means of the lens in the lens mount 69, thus forming a central octagonal exposed portion on the printing medium. Upon completing the exposure and turning off the light the primary and secondary frames are removed from the guides 79 and 53 respectively and are reinserted in the frame guides 53 and 96 respectively, this being accomplished without turning the printing medium or film about their own axes. The primary frame which contains the film and the mask is thus positioned in the path of the rays from the light source 71 so that when the switch 75 is closed these rays pass through the uppermost side aperture of the mask and side image of the film and are focused by the lens in the lens mount 110 so as to impinge on the lower portion of the printing medium now retained in the guide 96 on the circular plate 95, thus forming a side image on the printing medium. The switch 75 is closed only long enough to form an image corresponding in density to the previously formed central image.

Due to the fact that the plane of the printing medium is at an angle relative to the plane of the film, this angle being equal to the corresponding angle of obliquity at which the film was exposed, the image appearing on the printing medium will appear as a true vertical perspective according to the laws of correction for tilt. Furthermore, the transforming camera is so designed that the image cast by the film through the trapezoidal side aperture of the mask will be brought to the correct size to exactly match one side of the central octagonal exposed portion previously formed when projecting the central octagonal portion of the film.

This may best be understood by reference to Fig. 2 in which I have shown by dotted lines the shape of the side image formed on the printing medium relative to the shape of the side apertures of the mask 11. These dotted lines represent sides of a trapezoid and are designated respectively by the numerals 120, 121, and 122 which cooperate with a fourth side in completing the trapezoid, this fourth side lying along the side a—b of the central image formed on the printing medium. Inasmuch as this central image on the printing medium is not enlarged from the central image appearing on the film, it follows that this fourth side also lies along one side of the central aperture 13 of the mask 11. It should thus be understood that the side image formed on the printing medium corresponds in shape to the figure a—b—c—d of Fig. 2 and that this image now appears undistorted relative to the central image.

The pins 60 and 99 are then temporarily removed from the holes they formerly occupied, and the circular plates 50 and 95 are revolved one-eighth of a revolution until these pins slide into the next hole. The switch 75 is then again closed for the same period of time as previously, and the new side image which has been moved into the path of the light source 71 casts an image on the printing medium, one side of which lies along the side image previously formed and another side of which lies along one side of the central image previously formed. Thus, the new side image formed on the printing medium accurately matches both the central image and the side image previously formed. This operation is repeated until each of the eight trapezoidal side portions of the film have been projected on the printing medium, at which time the unitary picture may be developed and the finished image will be the same as though taken with a single lens.

Due to the fact that I have shown the frames 54 as being square and the printing medium therein as being of shape corresponding to the square shape of the mask 11, it follows that certain portions of the side images projected on the printing medium are not utilized, the apparatus illustrated being adapted to reproduce a square picture of the subject rather than an octagonal one. It should be understood, however, that by changing the shape of the printing medium and the frames 54, pictures of various shapes could be produced.

It should be understood that the novelty of my invention does not reside solely in the complete combination shown and described, but also resides in certain sub-combinations thereof. Thus, the provision of movable film and printing medium supports is one of the important details of my invention and finds utility whether or not transformation is being accomplished. Similarly the apparatus and method of my invention are not necessarily limited to the particular configuration of images on the film, but include various configurations whether or not the images are disjoined and whether or not a central image is present.

I claim as my invention:

1. A method of forming a unitary photographic image on a printing medium from a plurality of disjoined images appearing on a single film, said images being obliquely photographed at equal angles, which method includes the steps of: mounting said film and said printing medium at an angle equal to the angle of obliquity of said photographed images; and successively projecting said disjointed images onto said printing medium in matching relationship, the angle between the planes of said film and printing medium being maintained constant for each projection.

2. In a photographic printing machine, the combination of: means for passing light rays in turn through each of a plurality of side images of a film, each of said images having been photographed obliquely relative to the subject; means for retaining a printing medium in the path of said rays; and means for so positioning said last-named means that the images formed by said rays in passing in turn through each of said side images will match up to form a unitary pictorial image on said printing medium.

3. A combination as defined in claim 2 including a multi-aperture mask for accurately determining the contour of each image formed on said printing medium by said rays passing through said film whereby the images formed by said rays match up edge to edge.

4. In a printing apparatus for a film having a central image and side images therearound, the combination of: means for projecting light rays through said central image, said rays forming a central pictorial image on a printing medium; and means for projecting rays through each of said side images in a manner to form side pictorial images on said printing medium which match each other and said central pictorial image in a manner to form a unitary image on said printing medium.

5. A combination as defined in claim 4 in which said side images on said film were photographed obliquely relative to said central image and in which the plane of the film and the plane of the printing medium were parallel when forming said central pictorial image but non-parallel when forming said side pictorial images.

6. In a photographic printing machine adapted to print on a suitable printing medium a composite image of correct perspective by means of a plurality of images appearing on a film certain of which are distorted, the combination of: primary, secondary, and tertiary guides, said secondary and said tertiary guides being positioned at an angle relative to each other; primary and secondary frames respectively retaining said film and said printing medium and adapted to fit into said guides; and light sources adjacent said primary and said secondary guides.

7. In a photographic printing machine adapted to correct and print a plurality of separate distorted images formed on a single film and form them into a unitary image, the combination of: means for rotating said film about an axis perpendicular thereto; means for rotating a printing medium about an axis perpendicular thereto; means including a lens between said printing medium and said film for projecting said separate images in succession onto said printing medium in such a manner that the distortion of each image is corrected; and matching means including means for controlling the relative positions of said film and printing medium at each exposure for accurately matching the projected images impinging on said printing medium to form a unitary image thereon.

8. In a photographic printing machine adapted to correct and print a plurality of separate distorted images formed on a single film and form them into a unitary image, the combination of: means for rotating said film about an axis perpendicular thereto; means for rotating a printing medium about an axis perpendicular thereto; and means including a lens between said printing medium and said film for projecting said separate images in succession onto said printing medium in such a manner that the distortion of each image is corrected, the rays passing through said lens cutting across a line connecting the centers of rotation of said film and printing medium.

9. In a photographic printing machine adapted to correct and print a plurality of separate distorted images formed on a single film and form them into a unitary image, the combination of: means for rotating said film about an axis perpendicular thereto; means for rotating a printing medium about an axis perpendicular thereto; means including a lens between said printing medium and said film for projecting said separate images in succession onto said printing medium in such a manner that the distortion of each image is corrected; and a multi-aperture mask positioned adjacent said film for masking the light rays reaching said lens, said mask and said lens being correlated to accurately match edge to edge the images projected on said printing medium to form a unitary image of the matter originally photographed.

10. In combination in a device for forming a composite image from a plurality of individual distorted images appearing on a film in a closed circuit, each of said images forming said closed circuit being equally distorted in tilt: a printing medium supporting means; means for pivoting said printing medium supporting means about an axis perpendicular to the plane of a printing medium supported thereby; means for projecting onto said printing medium and to one side of said axis a corrected image of one of said distorted images; and means for pivotally mounting said film about an axis perpendicular thereto and lying inside said closed circuit formed by said images.

11. In a photographic printing machine adapted to form a unitary image from a plurality of separate images formed on a single film, said separate images comprising a central image and side images obliquely photographed relative to the direction of exposure of said central image, the combination of: means for projecting said central image onto a printing medium when said film is in a primary position; means for subsequently retaining said film in another position angularly disposed relative to said printing medium, the angle therebetween being substantially equal to the oblique angle at which said side images were photographed; means for projecting said side images onto said printing medium; and means for positioning said printing medium so that the projections of said central and side images form a unitary image.

12. In combination in a printing machine: walls defining a chamber; a primary guide means for retaining a film; a secondary guide means retaining either a film or a printing medium; a light source for projecting light rays through a portion of said film in said primary guide means; a lens in said chamber for focusing said light rays onto a printing medium retained in said secondary guide; and a light source in said chamber for subsequently projecting rays through said secondary guide means when said film is subsequently positioned therein.

13. In combination in a printing machine: walls defining a chamber; a primary guide means for retaining a film; a secondary guide means retaining either a film or a printing medium; a light source for projecting light rays through a portion of said film in said primary guide means; a lens in said chamber for focusing said light rays onto a printing medium retained in said secondary guide; a light source in said chamber for subsequently projecting rays through said secondary guide means when said film is subsequently positioned therein; a tertiary guide means disposed on the opposite side of said secondary guide means from said lens; and another lens between said secondary and tertiary guide means.

14. A method of forming a unitary image from obliquely exposed distorted images of adjacent areas of the subject photographed, said distorted images appearing on the same film, which method includes the steps of: projecting a corrected image of one of said distorted images; and subsequently projecting another corrected image of another of said distorted images in matching relationship with the first-named corrected image.

15. A method of forming a unitary photographic image of an area photographed on a single film including a plurality of obliquely exposed side areas disposed in a circle, which method includes the steps of: projecting one of said side images onto a printing medium to form a corrected image; rotating said film in its own plane and about an axis passing through the center of said circle an angular distance equal to the angle between adjacent side images; rotating said printing medium about an axis perpendicular thereto and through an angular distance equal to the angular displacement of said film; projecting an adjacent side image onto said printing medium in exact matching relationship with the image previously projected; and continuing these steps until all of said side images have been projected, the last image projected matching the projected image immediately preceding and also matching the first projected image.

LEON T. ELIEL.